United States Patent [19]

Weers et al.

[11] Patent Number: 5,223,127
[45] Date of Patent: Jun. 29, 1993

[54] HYDROGEN SULFIDE SCAVENGERS IN FUELS, HYDROCARBONS AND WATER USING AMIDINES AND POLYAMIDINES

[75] Inventors: Jerry J. Weers, Ballwin; Catherine E. Thomasson, Ellisville, both of Mo.

[73] Assignee: Petrolite Corporation, St. Louis, Mo.

[21] Appl. No.: 732,376

[22] Filed: Jul. 18, 1991

[51] Int. Cl.$^5$ .............................................. C10G 29/20
[52] U.S. Cl. ................................... 208/236; 208/189; 208/207; 208/208 R
[58] Field of Search ................... 208/189, 207, 208 R, 208/236, 47

[56] References Cited

U.S. PATENT DOCUMENTS

| | | | |
|---|---|---|---|
| 2,687,962 | 8/1954 | Chenicek | 99/163 |
| 3,645,896 | 2/1972 | Larsen | 252/8.55 D |
| 4,212,843 | 7/1980 | Oude Alink | 422/16 |
| 4,321,202 | 3/1982 | Mark . | |
| 4,388,213 | 6/1983 | Oppenlaender et al. | 252/392 |
| 4,713,184 | 12/1987 | Zaid | 252/8.552 |
| 4,802,973 | 2/1989 | Hodgson et al. | 208/236 |

FOREIGN PATENT DOCUMENTS

0405719A1 4/1990 European Pat. Off. .
2010237A 10/1978 United Kingdom .

*Primary Examiner*—Theodore Morris
*Assistant Examiner*—Walter D. Griffin
*Attorney, Agent, or Firm*—Kenneth Solomon

[57] ABSTRACT

A method for scavenging hydrogen sulfide in an aqueous and/or hydrocarbon medium is disclosed. According to the method, the medium is contacted with an effective amount of an amidine selected from the group consisting of monoamidines of from 1 to about 18 carbon atoms and polyamidines comprising from 2 to 3 amidine groups of from 1 to about 18 carbon atoms per amidine group.

16 Claims, No Drawings

HYDROGEN SULFIDE SCAVENGERS IN FUELS, HYDROCARBONS AND WATER USING AMIDINES AND POLYAMIDINES

BACKGROUND OF THE INVENTION

1. Field of the Invention

The present invention relates to the removal or suppression of hydrogen sulfide from hydrocarbons or water. In particular, the invention relates to such removal or suppression by chemical means.

2. Description of the Related Art

In the drilling, production, transport, storage, and processing of crude oil, including waste water associated with crude oil production, and in the storage of residual fuel oil, hydrogen sulfide, which is a very toxic substance, is often encountered. Also, at the oil well head, hydrogen sulfide-containing light hydrocarbon vapors are emitted and must be controlled. Uncontrolled emission of hydrogen sulfide gives rise to severe health hazards. Burning of such vapors neither solves the toxic gas problem nor is economical since the light hydrocarbons have significant value. Furthermore, hydrogen sulfide is often present in the underground water removed with the crude oil, in the crude oil itself and in the gases associated with such water and oil. When the water and oil are separated one from the other by the use of separation tanks, demulsification apparatus and the like, intolerable amounts of hydrogen sulfide are emitted as a gas which is associated with water and hydrocarbon vapors. Natural gases are often sour; that is they contain some hydrogen sulfides.

In accordance with the present invention, hydrocarbon liquids containing hydrogen sulfide, as well as hydrocarbon gases, such as natural gas or off gases from the production, transport, storage, and refining of crude oil can be controlled in a convenient and economical manner.

SUMMARY OF THE INVENTION

Briefly, therefore, the present invention is directed to a method for scavenging hydrogen sulfide in an aqueous and/or hydrocarbon medium. According to this method, the medium is contacted with an effective amount of an amidine selected from the group consisting of monoamidines of from 1 to about 18 carbon atoms and polyamidines comprising from 2 to 3 amidine groups of from 1 to about 18 carbon atoms per amidine group.

Among the several advantages of the invention, therefore, may be noted the provision of an improved method for scavenging hydrogen sulfide from hydrocarbon and/or aqueous media; and the provision of such method that is applicable to a wide variety of such media.

DETAILED DESCRIPTION OF THE INVENTION

In accordance with the present invention, it has been discovered that contacting an aqueous and/or hydrocarbon medium with certain amidines provides a highly effective technique for scavenging hydrogen sulfide in the medium. Polyamidines as well as monoamidines have been found to be effective.

Monoamidines found to be particularly effective in the subject method for scavenging hydrogen sulfide correspond to the formula

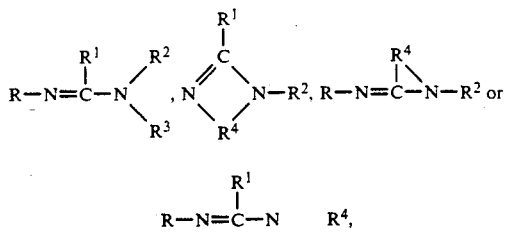

wherein R, $R^1$, $R^2$ and $R^3$ are independently selected from among H, alkyl groups of up to about 18 carbon atoms and aryl groups of up to about 18 carbon atoms and $R^4$ is an alkylene group of up to about 18 carbon atoms, provided that the total number of carbon atoms of R, $R^1$, $R^2$, $R^3$ and $R^4$ is from 1 to about 18. The alkyl, aryl and alkylene groups may be substituted or unsubstituted, branched or straight chains.

Generally, it is desirable to maintain a partial positive charge at the central carbon atom; i.e., the carbon between the two nitrogens. Thus, preferred radical groups maintain or increase the positive charge at that central carbon atom. In this respect, it has been found that it is preferred that $R^1$ be hydrogen or, more preferably, an aryl group, especially an aryl group substituted with an electron withdrawing group such a nitro, cyano or halide group.

In addition, it is desirable to maintain the basicity of the compositions imparted by the nitrogens. Thus, a cycloalkyl or, especially, hydrogen or a lower alkyl group is more desirable than phenyl for R, $R^2$ and $R^3$. Any of R, $R^1$, $R^2$ and $R^3$ may be substituted or unsubstituted alkyl or aryl groups. Hetero atoms such as oxygen, sulfur and nitrogen are suitable substituents. Likewise, $R^4$ may be a substituted or unsubstituted alkylene or arylene group. When liquid media are to be treated, R, $R^1$, $R^2$, $R^3$ and $R^4$ should be selected so that the amidine is soluble in the medium to be treated to the extent that a hydrogen sulfide-scavenging amount of the amidine may be intimately mixed into the medium.

Generally, therefore, the hydrogen sulfide scavenging effectiveness of amidine compositions of higher pKa values have been found typically to be higher than that of amidine compositions of lower pKa values. In fact, highly acidic compositions may tend to react to form inactive salts upon addition to a medium to be treated. Amidines of pKa=7 or higher, especially about 10 or higher, such as a cyclic amidine wherein the ring is six membered (e.g., tetrahydropyrimidine), are therefore preferred. Accordingly, cyclic groups have been found to be especially desirable for R, $R^2$ and $R^3$ and alkanolamines have also been found to yield superior results. For amidines that would produce an acidic environment, a buffer may be included in the composition to raise the pH.

Polyamidines such as those corresponding to the formula

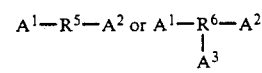

are also suitable for use in the subject method. In such formulae, the amidine groups $A^1$, $A^2$ and $A^3$ are independently selected from among

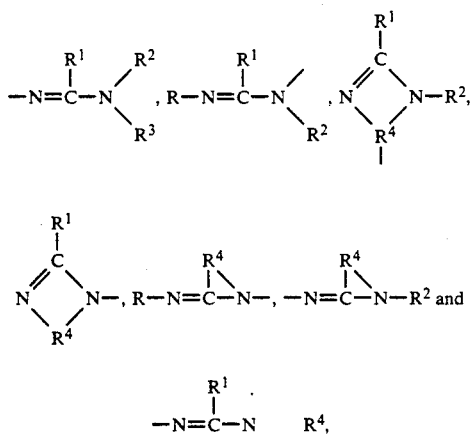

wherein R, $R^1$, $R^2$ and $R^3$ of each of $A^1$, $A^2$ and $A^3$ are independently selected from among H, alkyl groups of up to about 18 carbon atoms and aryl groups of up to about 18 carbon atoms, and $R^4$ of each of $A^1$, $A^2$ and $A^3$ is selected independently from among alkylene groups of up to about 18 carbon atoms, provided that the total number of carbon atoms of $R^1$, $R^2$, $R^3$ and $R^4$ per A is from 1 to about 18; $R^5$ is an alkylene group of up to about 8 carbon atoms or an arylene group of up to about 8 carbon atoms and $R^6$ is an alkylene group of up to about 8 carbon atoms or an arylene group of up to about 8 carbon atoms. As with the monoamidines, any of the alkyl, aryl, alkylene and arylene groups may be substituted or unsubstituted, branched or straight chains.

The same considerations involved in the selection of $R^1$, $R^2$, $R^3$ and $R^4$ apply to polyamidines as were discussed with respect to monoamidines. Thus, it is desirable to select groups that maintain or increase the positive charge at the central carbon and to produce a basic composition. Preferably, from about 2 to about 6 carbon atoms are between the amidine groups. $R^5$ and $R^6$ may contain heteroatoms and may be straight chained or branched. Cyclic groups and alkanol amines are especially desirable substituents for $R^1$, $R^3$ and $R^4$.

The amidines useful in the methods of this invention may be synthesized by any of a number of known techniques. For example, U.S. Pat. No. 4,321,202 to Mark describes methods for preparation of such amidines. Likewise, methods for preparation of amidines are described in Taylor and Ehrhart, "A Convenient Synthesis of N,N'-disubstituted Form Amidines and Acid Amidines", *Journal of Organic Chemistry*, Vol. 28, pps. 1108-1112 (April, 1963) and *Synthesis*, Jan. 1983, pp. 35-37.

In application, from about 10 ppm to about 500 ppm or more of the amidine of this invention is added to an aqueous and/or hydrocarbon medium. The amidine is effective in a wide range of media. Thus, not only is the amidine useful in aqueous media, but also in a wide variety of hydrocarbon media, for example, hydrocarbon distillate products such as diesel fuel, gasoline, kerosene, light cycle oil, light cycle gas oil, vacuum gas oil and even crude oil and residua. Where the medium is residuum, the amidine may be added by addition of a small amount of cutter stock containing the amidine. In cases in which the medium is a vapor, the amidine may be added by atomizing the amidine in a pipeline.

The following examples illustrate the invention:

EXAMPLE I

N-methyl formamide (15 g) was charged to a 200 ml round bottom flask containing toluene (10 ml). Dimethylcarbamyl chloride (27 g) was added in portions and the sample refluxed for about an hour. Initially, carbon dioxide was released vigorously. Reflux was discontinued upon ceasing of the carbon dioxide release. The sample was then cooled to ambient conditions and toluene stripped off on a rotovaporizer. A pale yellow solid remained. This solid (amidine HCl) was dissolved in chloroform (about 70 ml) and added to a 50% aqueous sodium hydroxide solution (25 g) and distilled water (20 ml). The sample was stirred well and allowed to separate. The chloroform layer was drawn off and filtered. Another aliquot of chloroform (20 ml) was added, stirred and separated. Both extracts were combined and the mixture distilled at 760 torr. Fractions were collected as follows: $F_1$ at 61° C.; $F_2$ at 64°-70° C.; $F_3$ at 70°-78° C.; $F_4$ at 80°-90° C.; $F_5$ at 90°-97° C.; and $F_6$ at 97°-102° C. Fraction 4 contained the desired product, although the boiling point of pure product according to the literature is 106° C. at 730 torr.

EXAMPLE II

Acetic acid (15 g) and triethyl orthoformate (37 g) were mixed and heated to about 100° C. Ethylamine (32.1 g of 70% by weight aqueous solution) was added dropwise and the resulting mixture was heated to reflux for two hours. The apparatus was fitted with a Dean Stark trap and volatile material (0.53 ml) was removed by distillation. Distillation was discontinued when the pot temperature reached 145° C. The mixture was then cooled and dichloromethane (50 g) was added. The resulting mixture was then added to a sodium carbonate (50 g)/distilled water (350 ml) mixture, stirred for five minutes and then transferred to a separation funnel. The organic layer was drawn off and the solvent evaporated on a rotovaporizer at 50° C. with an aspirator. NMR analysis showed the product to be impure, containing traces of acetic acid and possibly amidine acid salt. Yield was calculated at 4.8%.

EXAMPLE III

Acetic acid (6 g) and triethylorthoacetate (16.2 g) were mixed and ethylamine (12.9 g of a 70% aqueous solution) was added dropwise. A round bottom flask was fitted with a condenser to prevent loss of ethylamine. The mixture was then refluxed for two hours at 80° C. The volatile material was allowed to distill off into a Dean Stark trap, the sample was refluxed at a pot temperature of 140° C. 21 ml of material was collected and the mixture cooled overnight. The material was then diluted with methylene chloride (50 ml). The resulting solution was then poured into water (250 ml) containing sodium carbonate (50 g). The pH of the water phase after extraction was measured at 11. The mixture was then transferred to a separation funnel and allowed to separate. The lower organic phase was drawn off and potassium hydroxide pellets (about 5 g) were added to absorb residual water and complete neutralization of the amidine-acetate. After filtration, the remainder of the liquid was distilled at 65 torr. About 1 ml of liquid was left. Analysis of this liquid showed impurity.

EXAMPLE IV

A mixture of ethylorthoformate (34 g) and acetic acid (13.8 g) was heated to reflux (about 100° C.). Amine (CH$_3$(CH$_2$)$_3$NH$_2$, 33.6 g) was added rapidly. The mixture was refluxed for two hours. The apparatus was then fitted with a Dean Stark trap and volatile material (about 40 ml) was removed until the pot temperature raised to 160° C. rapidly. The sample was then cooled and shaken in a separatory funnel with ether and water (300 ml) containing sodium carbonate (50 g). Three layers formed and were separated. Each was allowed to stand in a beaker overnight to evaporate off the ether. About 25 ml of each layer remained and all combined and distilled at 0.9 torr. Two fractions were collected, one at 85° C. and 0.9 torr (3.05 g) and the other to 90° C. and 0.9 torr (4.13 g). These fractions showed a mixture of amidine and amide, possibly acetal and formamide.

EXAMPLE V

The amidine of Example IV was also prepared as follows: A mixture of acetic acid (13.8 g) and ethylorthoformate (34 g) was heated to reflux (about 100° C.). Amine (33.6 g of CH$_3$(CH$_2$)$_3$NH$_2$) was added rapidly by means of an addition funnel. The mixture was then refluxed for two hours and then stood over the weekend and then fitted with a Dean Stark trap and volatile material was collected (about 40 ml theoretical). Ethanol (35 ml) was removed. The pot temperature went up to 160° C. The amber colored viscous liquid was mixed With ether (200 ml) and 10% caustic/water (10 ml) was added to the ether mixture to convert the amidine-acetate to free amidine and water draw off. The pH of the water was 11. The ether mixture was evaporated on a rotovaporizer and about 40 ml of viscous amber liquid remained. This portion was distilled, with one fraction being collected at 80° C. and 0.7 torr. A water white, slightly viscous liquid was produced. NMR spectroscopy confirmed the amidine structure of the product.

EXAMPLE VI

Ethylorthoformate (17 g) was heated to about 100° C. and benzylamine (24.6 g) was added quickly. The mixture was heated to reflux. When the pot temperature reached about 140° C., what appeared to be ethanol began to distill. About 11 ml of liquid distilled into a Dean Stark trap. Distillation was discontinued when pot temperature reached about 150° C. Crystals formed which were purified by recrystallization in hexane. A yield of about 52% was calculated.

EXAMPLE VII

Triethylorthoformate (17 g) Was charged to a 250 ml round bottom flask and heated to about 100° C. Ethanolamine (14 g) was added in one dose and the mixture refluxed for 8 hours, until 20 ml of ethanol refluxed. NMR analysis of the product at this point showed an impurity and so the mixture was distilled under a vacuum and one fraction collected at 70°-75° C. and 20 torr. A yield of about 50% was calculated.

EXAMPLE VIII

Triethylorthoformate (17 g) was charged to a round bottom flask and heated to about 100° C. Diethylenetriamine (47.5 g) was added in one dose and the mixture was refluxed for several hours at about 140° C. before any liquid was observed and separated by means of the Dean Stark trap. Rheostat power was increased to increase the collection rate of the liquid and 15 ml of ethanol was collected in the trap. The product was distilled under a vacuum and two fractions were collected, one at 80°-90° C. at 20 torr (probably unreacted starting materials) and the other at 90°-100° C. at 20 torr. H$^1$NMR of the fraction that boiled at 90°-100° C. showed only a small amount of product formed. The latter fraction probably contained mostly unreacted starting material.

EXAMPLE IX

Acetic acid (30.6 g) was charged to a 250 ml round bottom flask. Ethylenediamine (30 g) was added dropwise over a 25 minute period while the mixture was cooled externally by an ice bath. At this point, a light tan-colored solid formed. The mixture was then heated to 230° C. and 18 ml of water distilled off. The sample was then transferred to a smaller round bottom flask and distilled under a vacuum until the pot temperature reached 180° C., at which point a white crystal substance had sublimed, clogging the condenser. Accordingly, distillation was discontinued. A small amount of the cooled material was then placed in the subliming apparatus under vacuum and hot water bath. A small amount of pure material sublimed.

EXAMPLE X

Acetic acid (30.6 g) was charged to a 250 ml round bottom flask. Propanediamine was added (dropwise to control the exotherm) over a 20 minute time period. The reacting mixture was cooled externally but this caused it to solidify. Accordingly, it was stirred at room temperature for about an hour and the sample stood overnight. Then it was heated to 130° C. for eight hours, until the water condensed off. About 16.5 ml of water was distilled off and the pot temperature increased to 140° C. Sample was then distilled under a vacuum—hot water condenser to yield a white solid. Fractions were drawn off at 80° C. and 0.5 torr and at 90°-100° C. and 0.5 torr. The former fraction probably contained an impure mixture of side reactions plus a small amount of amidine.

EXAMPLE XI

Various amounts of the amidines prepared in Examples I-X were added to light cycle gas/oil (LCGO) and to kerosene (KERO) containing various amounts of hydrogen sulfide. The hydrogen sulfide of the sample after the addition was measured and the resulting decrease in hydrogen sulfide concentration was calculated accordingly. More specifically, for each test, a sample (50 ml) of the fuel to be tested was placed in a two ounce bottle. The bottle was sealed with a cap and warmed to 100° F. (37.8° C.) in an oven for 30 minutes. A desired amount of the additive to be tested was then placed in the bottle and the bottle was shaken for 30 seconds. A known amount of hydrogen sulfide was then added quickly to the fuel using a sour kerosene stock solution (typically 30 to 50 μl of a saturated solution of hydrogen sulfide in kerosene) and the bottle was resealed and placed back in the oven. After one hour, the sample was removed from the oven, shaken for 30 seconds and poured into sparge test glassware. Next, the sample was sparged with nitrogen slowly (100 cm$^3$/min.) for at least about 30 minutes, or until discoloration of the detector tube was not observed for five minutes. The liquid phase hydrogen sulfide concentration was measured. These results were compared to various other additives tested by the same method and identified in the following chart:

CHART 1

| Additive Formulation | Formula |
|---|---|
| SB1 | Ph—CH=N—Ph |
| SB2 | $CH_3(CH_2)_2CH=N-CH(CH_3)_2$ |
| SB3 | $(CH_3)_2CHCH=N-CH(CH_3)_2$ |
| SB4 | Ph—CH=N—$CH(CH_3)_2$ |
| SB5 | $CH_3(CH_2)_2CH=N-C(CH_3)_3$ |
| SB6 | Ph—CH=N—$C(CH_3)_3$ |
| SB7 | $(CH_3)_2CH_2CH=N(CH_2)_2NH(CH_2)_2N=CH-CH(CH_3)_2$ |
| SB8 | Ph—CH=$NCH_2CH_2OH$ |
| SB9 | Ph—CH=N—$CH_2$—Ph |
| SB10 | TAN + Benzaldehyde |
| SB11 | 3-$NO_2$-Ph—CH=N—Ph |
| SB12 | 3-$NO_2$-Ph—CH=$NCH_2CH_2OH$ |

The results are shown in the following table:

TABLE 1
SCREENING OF EXPERIMENTAL COMPOUNDS USING GAS SPARGING METHOD TWO HOURS AT 100° F., 500 PPM ADDITIVE

| Example | Additive Designation | Class | Fuel | Blank | ppm $H_2S$ | $H_2S$ Decrease |
|---|---|---|---|---|---|---|
|  | SB1 | Schiff's Base | LCGO | 2000 | 1100 | 900 |
|  |  |  | KERO | 2000 | 1850 | 150 |
|  |  | Amidine | LCGO | 700 | 650 | 50 |
|  |  |  | KERO | 2000 | 250 | 1750 |
|  | SB2 | Schiff's Base | LCGO | 700 | 800 | 0 |
|  |  |  | KERO | 2000 | 1800 | 200 |
| I |  | Amidine | LCGO | 2250 | 1150 | 1100 |
|  |  |  | KERO | 2000 | 950 | 1050 |
|  | SB3 | Schiff's Base | LCGO | 550 | 500 | 50 |
|  |  |  | KERO | 2000 | 2000 | 0 |
|  |  | Schiff's Base | LCGO | 700 | 450 | 250 |
|  |  |  | KERO | 2000 | 1500 | 500 |
| II |  | Amidine | LCGO | 700 | 700 | 0 |
|  |  |  | KERO | 2000 | 950 | 1050 |
|  | SB5 | Schiff's Base | LCGO | 700 | 300 | 400 |
|  |  |  | LCGO | 2250 | 700 | 1550 |
|  |  |  | KERO | 2000 | 1200 | 800 |
|  | SB6 | Schiff's Base | LCGO | 700 | 500 | 200 |
|  |  |  | KERO | 2000 | 1550 | 450 |
|  |  |  | LCGO | 2200 | 550 | 1650 |
|  | SB7 | Schiff's Base | LCGO | 550 | 600 | 0 |
|  |  |  | KERO | 2000 | 2200 | 0 |
| III |  | Amidine | LCGO | 2000 | 250 | 1750 |
|  |  |  | LCGO | 500 | 200 | 350 |
|  |  |  | Not enough material left to test | | | |
|  | SB8 | Schiff's Base | LCGO | 2000 | 1500 | 500 |
|  |  |  | LCGO | 2250 | 300 | 1950 |
|  |  |  | LCGO | 1400 | 0 | 1400 |
|  |  |  | LCGO | 2000 | 100 | 1900 |
|  |  |  | KERO | 2000 | 800 | 1200 |
|  | SB9 | Schiff's Base | LCGO | 2250 | 2200 | 50 |
|  |  |  | KERO | 2000 | 1250 | 750 |
| IV |  | Amidine | LCGO | 2000 | 2000 | 0 |

TABLE 1-continued

SCREENING OF EXPERIMENTAL COMPOUNDS USING GAS SPARGING METHOD TWO HOURS AT 100° F., 500 PPM ADDITIVE

| Example | Additive Designation | Class | Fuel | Blank | ppm H$_2$S | H$_2$S Decrease |
|---|---|---|---|---|---|---|
| | | | LCGO | 2250 | 1100 | 1150 |
| | | | KERO | 2000 | 1350 | 650 |
| | SB10 | Schiff's Base | LCGO | 1500 | 400 | 1100 |
| | | | KERO | 1050 | 1000 | 50 |
| V | | Amidine | LCGO | 2000 | 1850 | 150 |
| | | | KERO | 1050 | 600 | 450 |
| VI | | Amidine | LCGO | 2250 | 850 | 1400 |
| | | | KERO | 1900 | 1000 | 900 |
| VII | | Amidine | LCGO | 1600 | 500 | 1000 |
| | | | KERO | 1900 | 100 | 1800 |
| | | In pH4 Buffer | LCGO | 2200 | 10 | 2190 |
| | | In pH10 Buffer | LCGO | 2200 | 10 | 2190 |
| VIII | | Amidine | LCGO | 1600 | 1200 | 400 |
| | | | KERO | 1900 | 550 | 1350 |
| | SB11 | Schiff's Base | LCGO | 1600 | 1200 | 400 |
| | | | LCGO | 2000 | 1600 | 400 |
| | | | KERO | 1900 | 1700 | 200 |
| | SB12 | Schiff's Base | LCGO | 1600 | 0 | 1600 |
| | | | LCGO | 1400 | 0 | 1400 |
| | | | LCGO | 2000 | 375 | 1625 |
| | | | KERO* | 1900 | 1200 | 700 |
| IX | | Imidazoline | LCGO | 1800 | 850 | 950 |
| | | | KERO | | | |
| | | | LCGO | 1500 | 100 | 1400 |
| | | | LCGO | 2200 | 1300 | 900 |
| | | In pH4 Buffer | LCGO | 2200 | 100 | 2100 |
| | | In IPA | LCGO | 2200 | 1300 | 900 |
| | | In pH4 Buffer | LCGO | 2200 | 100 | 2100 |
| | | In pH10 Buffer | LCGO | 2200 | 0 | 2200 |
| X | | Tetra Hydropyrimidine | LCGO | 2200 | 0 | 2200 |
| | | | KERO | 2300 | 0 | 2300 |
| | | In pH4 Buffer | LCGO | 2200 | 0 | 2200 |
| | | In IPA | LCGO | 2200 | 0 | 2200 |
| | | In pH10 Buffer | LCGO | 2200 | 0 | 2200 |
| | Benzamidine HCl Amidine | In IPA | LCGO | 1300 | 700 | 600 |
| | | In pH10 | LCGO | 1300 | 0 | 1300 |
| | | In pH10 | KERO | 2200 | 400 | 1800 |
| | Acetamidine HCl Amidine | In IPA | LCGO | 1300 | 800 | 500 |
| | | In pH10 | LCGO | 1300 | 75 | 1225 |
| | | In pH10 | KERO | 2200 | 100 | 2100 |
| | Glyoxylic Acid pH4 | Acid | LCGO | 2200 | 1300 | 900 |
| | | | LCGO | 2200 | 400 | 1800 |
| | | | KERO | 2300 | 1800 | 500 |
| | SB13 | Schiff's Base | LCGO | | | |
| | | | KERO | 2200 | 800 | 1400 |

*Additive not soluble in KERO.

TABLE 2

SCREENING OF EXPERIMENTAL COMPOUNDS USING GAS SPARGING METHOD ONE HOUR AT 100° F., 100 PPM ADDITIVE

| Example | Additive Designation | Class | Fuel | Blank | ppm H$_2$S | H$_2$S Decrease |
|---|---|---|---|---|---|---|
| X | | Tetrahydropyrimidine | | | | |
| | | In IPA | LCGO | 1300 | 400 | 900 |
| | | In pH4 Buffer | LCGO | 1300 | 0 | 1300 |
| | | In pH10 Buffer | LCGO | 1900 | 0 | 1900 |
| | | In IPA | KERO | 2900 | 0 | 2900 |
| | Benzamidine HCl Amidine | In pH10 Buffer | LCGO | 1200 | 250 | 950 |
| | | | LCGO | 2000 | 700 | 1300 |
| | | | KERO | 1400 | 600 | 800 |
| | Acetamidine HCl Amidine | in pH10 Buffer | KERO | 2900 | 1200 | 1700 |

EXAMPLE XII

Further tests were conducted according to the procedures of Example XI, but with residual fuel from Arco Petroleum and the additives identified as SB4 and SB11 in Example XI, the additive of Example VI and the following two additives:

| Additive Designation | Formula | Notes |
|---|---|---|
| Example XII-1 | 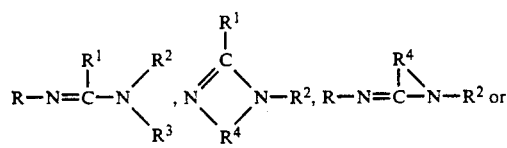 | C₁₇ contains some unsaturation. Sample was not pure. |
| Example XII-2 | 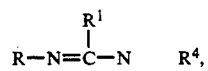 | |

The initial H₂S concentration was 1,000 ppm. The following results were obtained:

| Example | Additive Designation | Class | Final H₂S Concentration (ppm) | H₂S Decrease (ppm) |
|---|---|---|---|---|
| | SB4 | Schiff's Base | 830 | 170 |
| | SB11 | Schiff's Base | 780 | 220 |
| | Example XII-1 | Tetrahydropyrimide | 860 | 140 |
| | Example XII-2 | Tetrahydropyrimide | 580 | 420 |
| VI | | Amidine | 610 | 390 |

What is claimed is:

1. A method for scavenging hydrogen sulfide in an aqueous and/or hydrocarbon medium, comprising contacting the medium with an effective amount of an amidine having a pKa of at least about 5 and being selected from the group consisting of monoamidines of from 1 to about 18 carbon atoms and polyamidines comprising from 2 to 3 amidine groups of from 1 to about 18 carbon atoms per amidine group.

2. A method as set forth in claim 1, wherein the amidine is tetrahydropyrimidine.

3. A method as set forth in claim 1, wherein the medium is a liquid.

4. A method as set forth in claim 1, wherein the medium is a gas.

5. A method as set forth in claim 1, wherein the amidine has a pKa value of at least about 10.

6. A method for scavenging hydrogen sulfide in an aqueous an/or hydrocarbon medium, comprising contacting the medium with an effective amount of an amidine selected from the group consisting of (a) monoamidine compounds corresponding to the formula

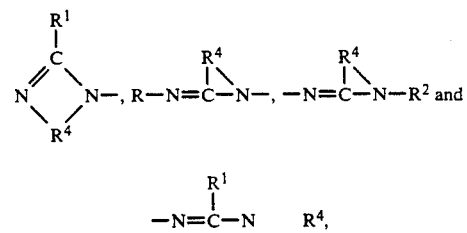

wherein R, R¹, R² and R³ are independently selected from among H, alkyl groups of up to about 18 carbon atoms and aryl groups of up to about 18 carbon atoms and R⁴ is independently selected from the group consisting of arylene groups and alkylene groups of up to about 18 carbon atoms, provided that the total number of carbon atoms of R, R¹, R², R³ and R⁴ present in the compound is from 1 to about 18; and (b) polyamidines corresponding to the formula

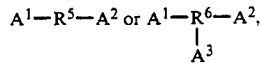

wherein A¹, A², and A³ are independently selected from among

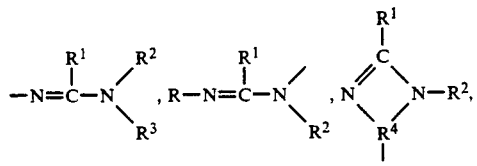

wherein R, R¹, R² and R³ of each of A¹, A² and A³ are selected independently from among H, alkyl groups of up to about 18 carbon atoms and aryl groups of up to about 18 carbon atoms and R⁴ of each of A¹, A² and A³ is selected independently from among alkylene groups of up to about 18 carbon atoms provided that the total number of carbon atoms of R¹, R², R³ and R⁴ per A is from 1 to about 18; R⁵ is an alkylene group of up to about 6 carbon atoms or an arylene group of up to about 6 carbon atoms and R⁶ is an alkylene group of up to about 10 carbon atoms or an arylene group of up to about 10 carbon atoms.

7. A method as set forth in claim 6, wherein the amidine is a polyamidine corresponding to the formula

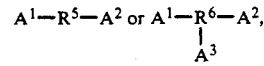

wherein A¹, A² and A³ are independently selected from among

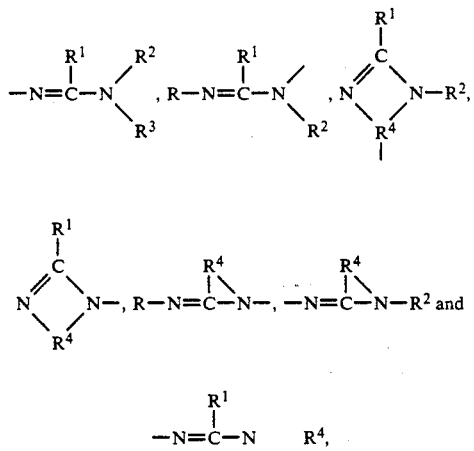

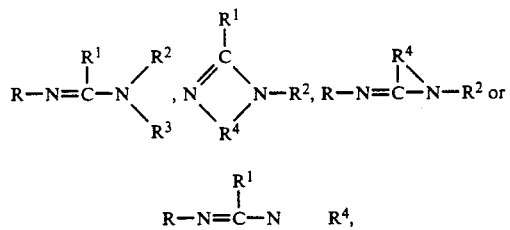

wherein R, $R^1$, $R^2$ and $R^3$ of each of $A^1$, $A^2$ and $A^3$ are selected independently from among H, alkyl groups of up to about 18 carbon atoms and aryl groups of up to about 18 carbon atoms and $R^4$ of each of $A^1$, $A^2$ and $A^3$ is selected independently from among alkylene groups of up to about 18 carbon atoms provided that the total number of carbon atoms of $R^1$, $R^2$, $R^3$ and $R^4$ per A is from 1 to about 18; $R^5$ is an alkylene group of up to about 6 carbon atoms or an arylene group of up to about 6 carbon atoms and $R^6$ is an alkylene group of up to about 10 carbon atoms or an arylene group of up to about 10 carbon atoms.

8. A method as set forth in claim 6, wherein the amidine has a pKa value of at least about 5.

9. A method as set forth in claim 8, wherein the amidine has a pKa value of at least about 10.

10. A method as set forth in claim 6, wherein the amidine is a monoamidine compound corresponding to the formula wherein R, $R^1$, $R^2$ and $R^3$ are independently selected from among H, alkyl groups of up to about 18 carbon atoms and aryl groups of up to about 18 carbon atoms and $R^4$ is independently selected from the group consisting of arylene groups and alkylene groups of up to about 18 carbon atoms, provided that the total number of carbon atoms of R, $R^1$, $R^2$, $R^3$ and $R^4$ present in the compound is from 1 to about 18.

11. A method as set forth in claim 10, wherein $R^1$ is independently selected from the group consisting of hydrogen and aryl groups.

12. A method as set forth in claim 11, wherein $R^1$ is an aryl group.

13. A method as set forth in claim 12, wherein $R^1$ is an aryl group substituted with an electron withdrawing group.

14. A method as set forth in claim 13, wherein the electron withdrawing group is selected from the group consisting of nitro, cyano and halide groups.

15. A method as set forth in claim 14, wherein R, $R^2$ and $R^3$ are independently selected from the group consisting of cyclic groups and alkenyl amine.

16. A method as set forth in claim 10, wherein $R^4$ is an alkylene group.

* * * * *

UNITED STATES PATENT AND TRADEMARK OFFICE
CERTIFICATE OF CORRECTION

PATENT NO. : 5,223,127

DATED : June 29, 1993

INVENTOR(S) : Jerry J. Weers and Catherine E. Thomasson

It is certified that error appears in the above-identified patent and that said Letters Patent is hereby corrected as shown below:

Column 2, line 10, delete the formula and substitute therefor

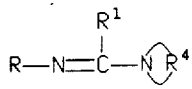

Column 3, line 18, delete the formula and substitute therefor

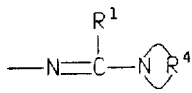

Column 11, line 59, delete the formula and substitute therefor

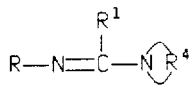

Column 12, line 44, delete the formula and substitute therefor

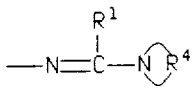

UNITED STATES PATENT AND TRADEMARK OFFICE
CERTIFICATE OF CORRECTION

PATENT NO. : 5,223,127

DATED : June 29, 1993

INVENTOR(S) : Jerry J. Weers and Catherine E. Thomasson

It is certified that error appears in the above-identified patent and that said Letters Patent is hereby corrected as shown below:

Column 13, line 20, delete the formula and substitute therefor

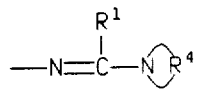

Column 14, line 13, delete the formula and substitute therefor

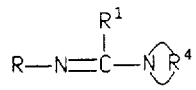

Signed and Sealed this

Third Day of May, 1994

Attest:

BRUCE LEHMAN

*Attesting Officer*     *Commissioner of Patents and Trademarks*